Oct. 14, 1952     C. B. LIMPRIGHT     2,613,883
FISHING REEL
Filed Jan. 2, 1947
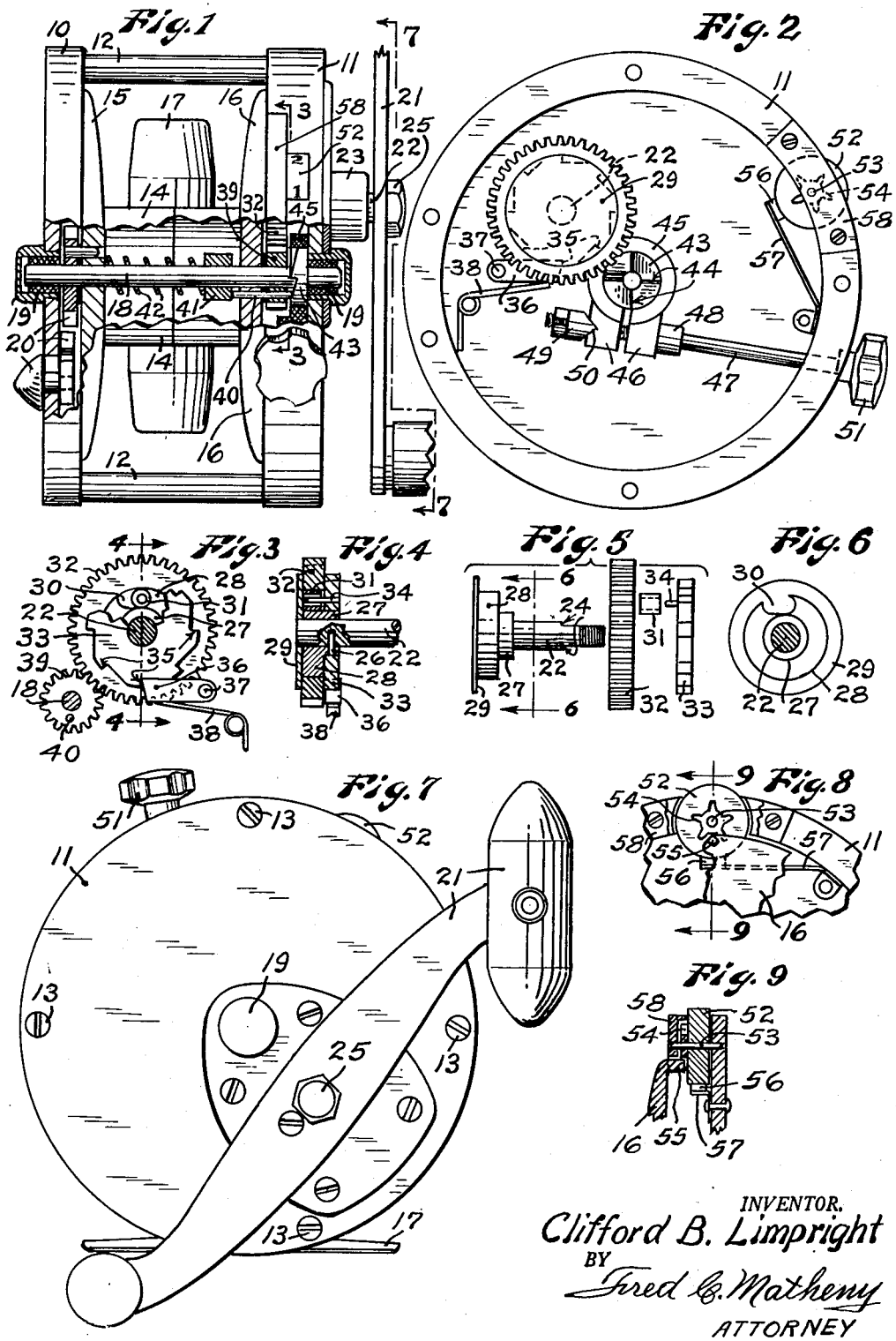
INVENTOR.
Clifford B. Limpright
BY Fred C. Matheny
ATTORNEY Patented Oct. 14, 1952

2,613,883

UNITED STATES PATENT OFFICE 2,613,883

FISHING REEL

Clifford B. Limpright, Marysville, Wash.

Application January 2, 1947, Serial No. 719,812

3 Claims. (Cl. 242—84.7)

This invention relates to a fishing reel and an object of this invention is to provide a fishing reel having a simple and efficient double ratchet clutch provided between the spool on which the line is wound and the crank by which said spool is turned to reel in the line, said clutch being instantaneous and automatic in its operation and serving to connect the spool with the crank when the crank is rotated in the proper direction to wind in the line and to disconnect the spool from the crank when a fish strikes and starts to run with the line thereby avoiding reverse rotation of the crank.

Another object is to provide a fishing reel having a novel metering device connected therewith to make it easier for a fisherman to let out the length of line which he has determined is most desirable for the conditions under which he is fishing.

Another object is to provide quickly and easily adjustable drag mechanism of novel and efficient construction that is operable to retard rotation of the spool which carries the line when the line is being drawn out but which is disconnected and inoperative when the spool is being rotated to wind in the line.

Other objects of the invention will be apparent from the following description taken in connection with the accompanying drawings.

In the drawings Figure 1 is a view partly in top plan and partly in section of a fish line reel constructed in accordance with this invention.

Fig. 2 is a detached view in elevation showing the inner face of the circular frame plate that is positioned at the right in Fig. 1 and showing double ratchet clutch mechanism and drag mechanism and metering devices that are carried by said frame plate.

Fig. 3 is a detached view in elevation, with parts in section, looking in the direction of broken line 3—3 of Fig. 1 and showing a double ratchet clutch member embodied in this invention.

Fig. 4 is a view in cross section of said clutch member looking in the direction of broken line 4—4 of Fig. 3.

Fig. 5 is an exploded view in elevation of the clutch mechanism shown in Figs. 3 and 4.

Fig. 6 is a view in elevation with parts in section taken on broken line 6—6 of Fig. 5.

Fig. 7 is a view in elevation of this reel looking in the direction of broken line 7—7 of Fig. 1.

Fig. 8 is a fragmentary view in elevation showing a metering or measuring device embodied in this invention.

Fig. 9 is a sectional view of said metering device taken substantially on broken line 9—9 of Fig. 8.

Like reference numerals designate like parts throughout the several views.

The drawings, particularly Figs. 1, 2 and 7, show a fishing reel comprising two circular end plates 10 and 11 having recessed inner faces and rigidly supported in spaced apart relation by a plurality of spacer bars 12. Screws 13 can be used to rigidly secure the end plates 10 and 11 and spacer bars 12 together and thus form a frame for a spool that is adapted to receive a line. The spool comprises a hollow drum portion 14 and two disc shaped end plates 15 and 16. A bracket plate 17 by which the reel can be mounted on a fishing rod is secured to some of the spacer bars 12.

A mounting shaft 18 extends axially through the spool 14, 15, 16, is rigidly secured to said spool and projects from each end thereof. The projecting end portions of said shaft 18 are journaled in bearing members 19 in the frame plates 10 and 11.

Suitable click mechanism 20 is preferably provided between the frame plate 10 and spool end 15, shown at the left in Fig. 1. This click mechanism can be of conventional construction and is not shown or described in detail herein.

The double ratchet clutch mechanism and drag mechanism and metering devices to which this invention is directed are operatively connected with the frame member 11 and are disposed between said frame member 11 and the end plate 16 of the spool. Also a crank 21 is mounted on the outer side of the frame member 11 for turning the spool to wind in a line.

The double ratchet clutch mechanism is always ready for instant engagement for the purpose of winding in the fish line. Also this mechanism is always ready for instant disengagement for the purpose of letting the line be pulled out by the run of a fish without reversely rotating the crank by which the spool is operated.

The double ratchet clutch mechanism, shown in Figs. 1 to 6 inclusive, comprises a bearing pin or stub shaft 22 journaled in an off-center position in a bearing 23 in the end frame member 11. The stub shaft 22 is provided with an outer end portion, Fig. 5, which is flattened, preferably on two opposite sides, and which has shoulders 24, and which is threaded as shown. The crank 21 is shaped and recessed so that it can be slipped over the flattened end portion of the stub shaft 22 anad fixedly secured thereto as by a nut 25.

The inner end portion of the stub shaft 22 is secured, as by a pin 26, Fig. 4, to a head portion which comprises a smaller bearing hub 27, a larger bearing hub 28 and an end plate 29 of larger diameter than the hub 28.

The parts 22, 27, 28 and 29 can be one integral piece but for convenience in manufacture I prefer to make the end plate 29 and stub shaft 22 separable from the two hubs 27 and 28, as shown in Fig. 4. The larger hub 28 has a peripheral notch 30. The notch 30 is provided with a bottom which is non-concentric as respects the hub 28 and which leaves said notch 30 deeper at one end than at the other. A tubular ratchet roller 31 is operatively disposed in the notch 30. An annular spur gear member 32 fits rotatively on the bearing hub 28 and has a cylindrical inner wall that can be engaged by the tubular ratchet roller 31. The end plate 29 overlaps the notch 30 and forms one end wall of said notch. A ratchet wheel 33 is mounted for oscillating movement on the smaller bearing hub 27 and forms an opposed end wall of the notch 30. Thus the tubular ratchet roller 31 is trapped within the notch 30. A pin 34 is carried by the ratchet wheel 33 and projects into the tubular ratchet roller 31. The diameter of the bore in the tubular ratchet roller 31 is substantially greater than the diameter of the pin 34 so that some lost motion is provided between the roller 31 and pin 34. This allows the tubular roller 31 to move radially into an engaged or disengaged position relative to the annular spur gear 32. At the same time the pin 34 provides a connection between the ratchet wheel 33 and the ratchet roller 31.

The ratchet wheel 33 has peripheral ratchet teeth 35 that are engaged by a pawl 36. The pawl 36 is pivotally mounted on the frame member 11 by a pivot 37 and is yieldingly urged against the ratchet wheel 33 by a spring 38.

The annular spur gear 32 meshes with a smaller spur gear 39 that is mounted on the shaft 18 and is secured to the end plate 16 of the line carrying drum as by a longitudinal movable pin 40.

The crank 21 is connected with the drum 28 by stub shaft 22. If these parts are moved clockwise, Figs. 3 and 7, the ratchet roller 31 will be wedged against the gearwheel 32 and will lock said gearwheel 32 to parts 28, 22 and 21 for the purpose of rotating the spool and winding in the line. If a pull is exerted on the line so as to rotate the spool in an unwinding direction, then this unwinding rotation of the spool will rotate the gearwheel 32 in a counterclockwise direction, Fig. 3. When this occurs rotation of the ratchet wheel 33 will be stopped by the pawl 36 and the pin 34 will hold the ratchet roller 31 against the wall at the deeper end of the notch 30, as shown at the right in Fig. 3. This will lock the parts 27, 28, 29, 22 and 21 against counterclockwise rotation, Fig. 3, but the gearwheel 32 will be free to turn counterclockwise without moving the ratchet roller 31 into an engaged position because said roller 31 is held in the deeper end of the notch 30 by the pin 34. Also the crank 21 cannot manually be rotated counterclockwise, Figs. 7 and 3, because the ratchet wheel 33, restrained by pawl 36, holds pin 34 and ratchet roller 31 immovable against the wall at the deeper end of the notch 30 thus blocking rotation in this direction of the drum 28 and crank 21 connected therewith.

The pawl 36, being spring pressed against the ratchet wheel 33 always exerts a slight drag or retarding action in opposition to clockwise rotation, Fig. 3, of this ratchet wheel. This drag action on ratchet wheel 33 is applied to the ratchet roller 31 through the pin 34 and always helps to insure instantaneous engagement of the ratchet roller 31 with the gearwheel 32 if the crank 21 is moved to wind in the line.

The pin 40 by which the smaller spur gear 39 is secured to the spool passes through the end plate 16 and spur gear 39 as shown in Fig. 1. One end portion of this pin 40 is positioned within the hollow drum 14 and is connected with a sleeve 41 that is slidable on the shaft 18. A compression spring 42 yieldingly urges the sleeve 41 and pin 40 outwardly. The other end portion of the pin 40 is positioned in engagement with a crown type ratchet drag disc 43 which is rotatively mounted on the shaft 18 and has ratchet teeth 44 on the face thereof against which the pin 40 is urged.

Obviously when the spool 14—15—16 is rotated in one direction the pin 40 will engage with the teeth 44 of the drag disc 43 and rotate the drag disc 43 along with the spool. When said spool is rotated in the opposite direction the pin 40 will click over the teeth 44 without rotating the drag disc 43. In the use of the reel the fishing line will be wound on the spool 14—15—16 in a direction such that when the line is being drawn out, as by the pull of a fish, the drag disc 43 will be rotated with the spool and when the line is being reeled in the pin 40 can click over the teeth of the drag disc 43.

The periphery of the drag disc 43 is engaged by a brake band 45 of any suitable friction material. The band 45 has extensions or lugs 46 rigid with its two end portions. A brake band tightening screw 47 extends through the lugs 46. A fixed collar 48 is secured to the screw 47 on one side of the two lugs 46. A nut 49 is threaded onto the screw 47 on the other side of the lugs 46. The nut 49 is locked to the adjacent lug 46, to prevent it from turning, by providing on said nut a protruding portion 50 shaped like a blunt wedge and adapted to fit into a similarly shaped recess in the adjacent lug 46. The brake band tightening screw 47 extends out through the side portion of the frame member 11 and is provided on its outer end with a knob 51 by which it may be turned.

In the operation of the double ratchet clutch mechanism the line carrying spool is rotated to wind in the line by turning the crank 21 in a clockwise direction as respects the showing in Fig. 7. When the crank member 21 is thus turned in a clockwise direction, as respects the showing in Fig. 7, the stub shaft 22 and parts 27, 28 and 29 which are fixedly connected therewith, see Figs. 4 and 5, will be rotated in the same direction. When parts 21, 22, 27, 28 and 29 are thus rotated clockwise as respects the showing in Figs. 3, 6 and 7, the ratchet roller 31 will be relatively moved toward the more shallow end of the notch 30 and will lock the annular spur gear 32 to the other rotating parts. This will provide a driving connection to the spool 14—15—16 through the small spur gear 39 which is secured to the spool member 16 and meshes with the annular gearwheel 32. Thus the spool will be rotated in a direction reverse to the direction of rotation of the crank in winding in a fishing line that is carried by said spool. When the parts just described are being rotated to wind in a line the ratchet wheel 33 will be rotated synchronously with the parts 27, 28, 29 and 32 due to engagement of the pin 34 in the ratchet roller 31 and the teeth of this ratchet wheel will click over the pawl 36. The drag of the pawl 36 on the ratchet wheel 33 will exert a light pressure through the pin 34 that will tend to hold the ratchet roller 31 in an engaged position as long as the crank is being turned in the required direction to wind in the line. The force thus exerted through pin 34 on ratchet roller 31 will also insure instant engagement of the roller 31 with the annular gearwheel 32 if said roller 31 is in a disengaged position and winding in movement of the crank 21 is started.

If a fish is hooked and starts to run with the line the sudden pull on the line will impart rotary movement to the spool and to the ratchet wheel 33 in a reverse or unwinding direction. This will instantly cause a tooth of the ratchet wheel 33 to abut against the pawl 36 thereby locking the ratchet wheel 33 against further reverse rotation and moving the ratchet roller 31 into an unlocked position. This leaves the annular spur gear 32 free to rotate on the hub 28 as the fish runs with the line. Thus there will be no reverse rotation of the crank 21 when a fish strikes and starts to run with the line and this will be true irrespective of whether the crank is stationary or is being rotated in the act of winding in the line at the time the fish strikes. In either instance the quick jerk or pull of the fish unlocks the ratchet roller and allows the fish to run with the line.

The double clutch mechanism thus provides a simple, inexpensive and very reliable means for interconnecting the crank 21 with the spool 14, 15, 16 in such a manner that rotation of the crank in one direction will always rotate the spool and wind in the line while at the same time a pull or jerk on said line can always unlock the ratchet roller 31 and allow unwinding movement of the spool without reversely rotating the crank 21.

A metering device to make it easier for the user of this reel to determine the amount of line he unreels is provided. This metering device, Figs. 1, 2, 8 and 9, comprises a metering disc 52 mounted in the upper peripheral portion of the frame member 11 on a bearing member 53. The circumferential portion of the metering disc 52 can be numbered, as shown in Fig. 2, or it can be otherwise marked so that the number of revolutions of this disc can be obverved and counted as the line is being payed out or wound in. A spur wheel 54 is secured to the metering disc 52 in a position adjacent the periphery of the drum disc 16. A lug 55 on the drum disc 16 is positioned so that it will engage with a tooth of the spur wheel 54 and advance the metering disc one step at each revolution of the line carrying drum. A brake member 56 supported by a spring 57 contacts the circumference of the metering disc 52 with sufficient force to prevent overtravel or accidental displacement of this disc 52. A retaining plate 58, shown in Figs. 2 and 9 and partially broken away in Fig. 8 holds the disc 52 and spur wheel 54 in place. If the spur wheel 54 has five teeth, as shown in Figs. 2 and 8, then the metering disc 52 will be turned one revolution for each five revolutions of the line carrying drum. Obviously this ratio can be varied at will. The user can keep a mental record of the length of line he has out by counting the number of turns of the metering disc 52. Thus if he finds by trial that with a certain number of turns of line out he can catch more fish or get more strikes than he can if he has out a greater or a less number of turns of line, he always can, by observing the metering disc 52, count out the correct length of line and he does not need to know the length of this correct amount of line in terms of feet or yards.

The drag mechanism operates in an obvious manner. When the spool 14, 15, 16 is rotating in one direction to let out line this drag mechanism will always be operative. When this spool is rotating in the other direction to wind in line the pin 40 will click over the ratchet disc 43 and the drag mechanism will be inoperative. The brake force applied by this drag can be very quickly and easily varied by adjustment of the screw 47.

Obviously changes in this invention can be made within the scope of the following claims.

I claim:

1. A fishing reel comprising two relatively rigid spaced apart end plates; a spool rotatively supported between said end plates; a stub shaft journaled in and extending through one of said end plates; a crank member on the outer end portion of said stub shaft; driving gear means interconnecting said spool and said stub shaft; said driving gear means including a gearwheel rotatively supported on said stub shaft; a roller ratchet connecting said gearwheel with said stub shaft; a ratchet wheel rotatively mounted on said stub shaft; a pawl pivotally mounted on the end plate adjacent said ratchet wheel and engaging said ratchet wheel preventing rotation of said ratchet wheel in one direction; and means connecting said ratchet wheel with the roller in said roller ratchet for releasing said roller ratchet, when turning movement of said ratchet wheel is stopped by said pawl, whereby when said spool is being turned in one direction to wind in a line a jerk on said line can reversely rotate said spool and draw out the line without rotating said crank.

2. A fishing reel comprising two relatively rigid spaced apart end plates; a spool rotatively supported between said end plates; a stub shaft journaled in and extending through one of said end plates; a crank member on the outer end portion of said stub shaft; drum means rigid with said stub shaft; a gearwheel rotatively mounted on said drum means; roller ratchet means including a tubular roller operatively disposed between said gearwheel and said drum means and movable between an engaging and a disengaging position relative to said gearwheel and said drum means; a ratchet wheel rotatively mounted on said drum means alongside of said gear wheel; a spring pressed pawl carried by one of said end plates engaging said ratchet wheel and stopping rotation of said ratchet wheel in one direction; a pin on said ratchet wheel loosely engaged within said ratchet roller controlling movement of said roller between an engaged and a disengaged position; and means providing a driving connection between said gearwheel and said spool, said ratchets providing means whereby when said spool is being turned by said crank in one direction to wind in a line a jerk on said line can reversely rotate said spool and draw out the line without reversely rotating the crank.

3. A fishing reel comprising two relatively rigid spaced apart end plates; a spool rotatively supported between said end plates; a stub shaft journaled in and extending through one of said end plates; a crank member on the outer end portion of said stub shaft; drum means rigid with said stub shaft; a gearwheel rotatively mounted on said drum means; a ratchet wheel rotatively mounted on said drum means alongside of said gearwheel; a recess in the peripheral portion of said drum means on which said gearwheel is mounted, said recess being deeper at one end than at the other; a tubular ratchet roller in said recess said tubular roller being loosely supported when in a deeper portion of said notch and being adapted to wedge against said gearwheel when in a shallower portion of said notch; a pin on said ratchet wheel extending into the opening in said tubular roller, the opening in the roller being larger than said pin to provide lost motion between the pin and the roller; a pawl stopping said ratchet wheel against rotation in one direction; said roller being moved into released position by the stopping of said ratchet wheel by said pawl and means forming a driving connection between said gearwheel and said spool, said ratchets providing means whereby when said spool is being turned by said crank in one direction to wind in a line a jerk on said line can reversely rotate said spool and draw out the line without reversely rotating the crank.

CLIFFORD B. LIMPRIGHT.

REFERENCES CITED

The following references are of record in the file of this patent:

UNITED STATES PATENTS

| Number | Name | Date |
| --- | --- | --- |
| 485,635 | Lake | Nov. 8, 1892 |
| 1,554,786 | Case | Sept. 22, 1925 |
| 1,765,903 | Case | June 24, 1930 |
| 1,836,755 | Hirsch | Dec. 15, 1931 |
| 2,089,031 | MacDonald | Aug. 3, 1937 |
| 2,219,322 | King | Oct. 29, 1940 |
| 2,364,047 | Bardon | Dec. 5, 1944 |